(12) United States Patent
Okada et al.

(10) Patent No.: US 10,355,298 B2
(45) Date of Patent: *Jul. 16, 2019

(54) RESIN FILM, LAMINATE, METHOD FOR PRODUCING SAME, AND METHOD FOR PRODUCING FUEL CELL

(71) Applicants: DAICEL VALUE COATING LTD., Tokyo (JP); DAICEL CORPORATION, Osaka-shi, Osaka (JP)

(72) Inventors: Kazuyuki Okada, Amagasaki (JP); Kanae Nishimura, Amagasaki (JP)

(73) Assignees: DAICEL VALUE COATING LTD., Tokyo (JP); DAICEL CORPORATION, Osaka-Shi (JP)

( * ) Notice: Subject to any disclaimer, the term of this patent is extended or adjusted under 35 U.S.C. 154(b) by 107 days.

This patent is subject to a terminal disclaimer.

(21) Appl. No.: 15/308,703

(22) PCT Filed: Apr. 30, 2015

(86) PCT No.: PCT/JP2015/063038
§ 371 (c)(1),
(2) Date: Nov. 3, 2016

(87) PCT Pub. No.: WO2015/178191
PCT Pub. Date: Nov. 26, 2015

(65) Prior Publication Data
US 2017/0141423 A1    May 18, 2017

(30) Foreign Application Priority Data

May 19, 2014   (JP) .................... 2014-103604

(51) Int. Cl.
| | | |
|---|---|---|
| *C08L 23/18* | (2006.01) | |
| *C08L 23/20* | (2006.01) | |
| *C08L 27/08* | (2006.01) | |
| *C08L 45/00* | (2006.01) | |
| *C09D 123/18* | (2006.01) | |
| *C09D 123/20* | (2006.01) | |
| *C09D 127/08* | (2006.01) | |
| *C09D 145/00* | (2006.01) | |
| *H01M 8/1004* | (2016.01) | |

(Continued)

(52) U.S. Cl.
CPC ........... *H01M 8/1004* (2013.01); *B32B 27/00* (2013.01); *B32B 37/12* (2013.01); *B32B 43/006* (2013.01); *C08L 45/00* (2013.01); *H01M 4/88* (2013.01); *H01M 8/02* (2013.01); *H01M 8/10* (2013.01); *B32B 7/06* (2013.01); *B32B 7/08* (2013.01); *B32B 23/08* (2013.01); *B32B 27/28* (2013.01); *B32B 27/281* (2013.01); *B32B 27/30* (2013.01); *B32B 27/304* (2013.01); *B32B 27/306* (2013.01); *B32B 27/32* (2013.01); *B32B 27/325* (2013.01); *B32B 27/34* (2013.01); *B32B 27/36* (2013.01); *B32B 37/26* (2013.01); *B32B 38/10* (2013.01); *B32B 2037/268* (2013.01); *B32B 2250/03* (2013.01); *B32B 2255/10* (2013.01); *B32B 2255/26* (2013.01); *B32B 2307/748* (2013.01); *B32B 2457/18* (2013.01); *C08J 5/20* (2013.01); *C08J 5/22* (2013.01); *C08J 2427/08* (2013.01); *C08J 2445/00* (2013.01); *C08L 23/18* (2013.01); *C08L 23/20* (2013.01); *C08L 27/08* (2013.01); *C09D 123/18* (2013.01); *C09D 123/20* (2013.01); *C09D 127/08* (2013.01); *C09D 145/00* (2013.01); *H01M 4/02* (2013.01); *H01M 4/04* (2013.01); *H01M 8/1018* (2013.01); *H01M 8/1039* (2013.01); *H01M 8/1069* (2013.01); *H01M 8/1086* (2013.01); *H01M 2008/1095* (2013.01); *Y02P 70/56* (2015.11);

(Continued)

(58) Field of Classification Search
None
See application file for complete search history.

(56) References Cited

U.S. PATENT DOCUMENTS

| | | | |
|---|---|---|---|
| 2,384,881 A | | 9/1945 | Britton et al. |
| 3,855,358 A | * | 12/1974 | Watts ...................... C08L 27/06 |
| | | | 525/211 |

(Continued)

FOREIGN PATENT DOCUMENTS

| | | | |
|---|---|---|---|
| EP | 0 835 916 A | * | 4/1998 |
| JP | 4-65449 A | | 3/1992 |

(Continued)

OTHER PUBLICATIONS

International Search Report for PCT/JP2015/063038 dated Aug. 11, 2015.

(Continued)

*Primary Examiner* — Vivian Chen
(74) *Attorney, Agent, or Firm* — Birch, Stewart, Kolasch & Birch, LLP

(57) ABSTRACT

A polymer film comprises a polymer composition containing (A) a cyclic olefin polymer and (B) a chlorine-containing polymer. The chlorine-containing polymer (B) may comprise a vinylidene chloride-series polymer. The cyclic olefin polymer (A) may comprise a cyclic olefin copolymer. The ratio of the chlorine-containing polymer (B) relative to 100 parts by weight of the cyclic olefin polymer (A) may be 0.5 to 60 parts by weight. The film has a moderate releasability from an electrolyte membrane and an electrode membrane of a polymer electrolyte fuel cell and a moderate adhesion to the electrolyte membrane and the electrode membrane and can adhere to a commonly-used substrate film without interposition of an adhesive layer such as an easily adhesive layer. The film is thus suitable as a release film for producing a membrane electrode assembly of a polymer electrolyte fuel cell.

13 Claims, No Drawings

(51) Int. Cl.
| | |
|---|---|
| H01M 8/1018 | (2016.01) |
| H01M 8/1039 | (2016.01) |
| H01M 8/1069 | (2016.01) |
| H01M 8/1086 | (2016.01) |
| B32B 7/06 | (2019.01) |
| B32B 7/08 | (2019.01) |
| C08J 5/20 | (2006.01) |
| C08J 5/22 | (2006.01) |
| H01M 4/02 | (2006.01) |
| H01M 4/04 | (2006.01) |
| H01M 4/88 | (2006.01) |
| H01M 8/02 | (2016.01) |
| H01M 8/10 | (2016.01) |
| B32B 23/08 | (2006.01) |
| B32B 27/00 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 37/12 | (2006.01) |
| B32B 37/26 | (2006.01) |
| B32B 38/10 | (2006.01) |
| B32B 43/00 | (2006.01) |

(52) U.S. Cl.
CPC .... Y10T 428/3175 (2015.04); Y10T 428/3188 (2015.04); Y10T 428/3192 (2015.04); Y10T 428/31721 (2015.04); Y10T 428/31757 (2015.04); Y10T 428/31797 (2015.04); Y10T 428/31888 (2015.04); Y10T 428/31891 (2015.04); Y10T 428/31909 (2015.04); Y10T 428/31913 (2015.04); Y10T 428/31928 (2015.04); Y10T 428/31935 (2015.04); Y10T 428/31938 (2015.04)

(56) References Cited

U.S. PATENT DOCUMENTS

| | | | | |
|---|---|---|---|---|
| 4,057,672 A * | 11/1977 | Creekmore | ............ | C08K 13/02 428/220 |
| 4,088,725 A * | 5/1978 | Bennington | ............ | C08L 27/06 264/567 |
| 4,140,731 A * | 2/1979 | Nakamura | ............ | C08G 61/08 525/210 |
| 5,298,551 A * | 3/1994 | Yamamoto | ............ | C08L 23/08 524/306 |
| 5,658,998 A * | 8/1997 | Minami | ............ | C08F 210/02 526/281 |
| 6,165,573 A * | 12/2000 | Hirose | ............ | B32B 27/08 428/36.6 |
| 6,268,070 B1 * | 7/2001 | Bergstresser | ........ | H05K 3/4652 428/209 |
| 6,296,920 B1 | 10/2001 | Buehler et al. | | |
| 6,329,047 B1 * | 12/2001 | Beer | ............ | B32B 27/08 428/215 |
| 2003/0223657 A1 * | 12/2003 | Belias | ............ | B65D 31/02 383/105 |
| 2005/0186373 A1 * | 8/2005 | Rhee | ............ | B32B 27/32 428/35.7 |
| 2007/0202337 A1 * | 8/2007 | Lischefski | ............ | B32B 27/08 428/411.1 |
| 2008/0075921 A1 * | 3/2008 | Tateishi | ............ | H05B 33/10 428/141 |
| 2009/0017295 A1 | 1/2009 | Liu et al. | | |
| 2009/0040451 A1 | 2/2009 | Suzuki | | |
| 2010/0062187 A1 * | 3/2010 | Takahashi | ............ | B05D 7/04 428/1.1 |
| 2010/0062225 A1 * | 3/2010 | Takahashi | ............ | C08F 2/48 428/172 |
| 2010/0075203 A1 * | 3/2010 | Braeuninger | ....... | H01M 4/8657 429/483 |
| 2010/0143708 A1 * | 6/2010 | Liao | ............ | B32B 17/10 428/336 |
| 2012/0021335 A1 | 1/2012 | Sugioka et al. | | |
| 2013/0134698 A1 * | 5/2013 | Mayrhofer | ............ | G09F 3/0292 283/81 |
| 2013/0161938 A1 * | 6/2013 | Mayrhofer | ............ | G09F 3/0292 283/81 |
| 2014/0147666 A1 * | 5/2014 | Sakamoto | ............ | B32B 1/00 428/354 |
| 2015/0180072 A1 * | 6/2015 | Lee | ............ | B32B 29/002 156/308.2 |
| 2016/0071756 A1 * | 3/2016 | Moore | ............ | H01L 21/6835 269/289 R |
| 2016/0276689 A1 * | 9/2016 | Onomichi | ............ | B29C 33/68 |
| 2017/0098847 A1 * | 4/2017 | Okada | ............ | H01M 8/1069 |

FOREIGN PATENT DOCUMENTS

| | | |
|---|---|---|
| JP | 4-85353 A | 3/1992 |
| JP | 10-231385 A | 9/1998 |
| JP | 2000-95957 A | 4/2000 |
| JP | 2001-55489 A | 2/2001 |
| JP | 2001-98123 A | 4/2001 |
| JP | 2005-139392 A | 6/2005 |
| JP | 2006-96880 A | 4/2006 |
| JP | 2007-99824 A | 4/2007 |
| JP | 2009-102558 A | 5/2009 |
| JP | 2010-234570 A | 10/2010 |
| JP | 2014-151483 A | 8/2014 |

OTHER PUBLICATIONS

Written Opinion of the International Searching Authority for PCT/JP2015/063038 (PCT/ISA/237) dated Aug. 11, 2015.
Extended European Search Report dated Oct. 6, 2017, in European Patent Application No. 15795404.1.

* cited by examiner

RESIN FILM, LAMINATE, METHOD FOR PRODUCING SAME, AND METHOD FOR PRODUCING FUEL CELL

TECHNICAL FIELD

The present invention relates to a polymer film for use in producing a polymer electrolyte fuel cell or others, a laminate (laminated film) containing the polymer film and a process for producing the same, and a process for producing a membrane electrode assembly using the laminate.

BACKGROUND ART

Polymer electrolyte fuel cells (or solid polymer fuel cells) have a basic component called a membrane electrode assembly (MEA). The MEA is obtainable by laminating an electrode membrane (a catalyst layer or an electrode catalyst membrane) on either side of a polymer electrolyte membrane and putting the resulting laminate between a fuel gas supply layer and an air supply layer; the electrode membrane contains, as a main component, a platinum group metal catalyst supported on a carbon powder, the polymer electrolyte membrane is an ion exchange membrane, and the fuel gas supply layer and the air supply layer are an electroconductive porous membrane. For the MEA, both electrolyte membrane and electrode membrane contain an ion exchange polymer. The electrolyte membrane and the electrode membrane are usually formed by a casting method and/or a coating method, or other methods. A method of laminating the electrolyte membrane and the electrode membrane usually comprises allowing an electrolyte membrane formed on a support to closely contact with an electrode membrane formed on a support, thermocompression bonding these membranes at about 130 to 150° C. (about 150 to 200° C. according to a material used) and a pressure of about 1 to 10 MPa, and then separating the supports from these membranes. Thus, as the support, a release film is used. The release film requires a moderate (or reasonable) releasability (peelability) from the electrolyte membrane and the electrode membrane and a moderate (or reasonable) adhesion to the electrolyte membrane and the electrode membrane. The ion exchange polymer contained in the electrolyte membrane and the electrode membrane has a unique structure that has a main chain being a highly releasable fluoropolymer and a side chain containing a poorly releasable sulfonic acid group. This makes it difficult to predict the releasability behavior and to balance the releasability and the adhesion. The release film is practically laminated on a substrate film having high mechanical characteristics in order to achieve improved handling or improved production. Unfortunately, it is difficult to improve the adhesion of the release film to a commonly-used substrate film having no reactive groups or other groups. The release film for the production of a fuel cell further requires heat resistance for reasons of production process. The release film, which is produced by a roll-to-roll processing in terms of efficient production, also requires flexibility. As the release film, a fluorine-containing film is widely used. The fluorine-containing film has excellent heat resistance, releasability, and stain resistance, while the film is expensive and less combustible in waste incineration after use, and easily generates a poisonous gas. The film, which has a low elastic modulus, is difficult to produce by a roll-to-roll processing. In place of the fluorine-containing film, a release film containing a cyclic olefin polymer is also reported.

Japanese Patent Application Laid-Open Publication No. 2010-234570 (JP-2010-234570A, Patent Document 1) discloses a release film made of a cycloolefin copolymer and also describes a release film formed by coating a solution of a cycloolefin copolymer on a substrate film such as a poly(ethylene terephthalate) film. In working examples of the document, a solution containing a copolymer of ethylene and norbornene is cast on a poly(ethylene terephthalate) film using a flow-casting apparatus to form a release film having a thickness of 0.5 μm.

This release film has an excellent releasability from an electrolyte membrane or an electrode membrane containing an ion exchange polymer, while the release film has a low adhesion to a poly(ethylene terephthalate) film and is easily separated from the substrate film. This reduces the handleability of the release film or the production of the MEA. Further, the releasability of the release film from the electrolyte membrane or the electrode membrane is insufficient for a high-temperature production process of the MEA.

Japanese Patent Application Laid-Open Publication No. 2009-102558 (JP-2009-102558A, Patent Document 2) discloses a laminated film stacked on a plastic substrate. The laminated film has a first layer composed of a chlorine-containing polymer, and a second layer laminated on the first layer and composed of a cyclic olefin polymer. Each of the first layer and the second layer is formed by coating. This document describes that the laminated film is utilizable for an industrial material such as an industrial release film, a packaging film for food, pharmaceutical, chemical, or other products, and an optical member such as a polarization plate for liquid crystal. The document also describes a copolymer of a cyclic olefin and a chain olefin as a preferred cyclic olefin polymer.

However, this document is silent on a fuel cell. Further, the complicated structure of the laminated film would reduce fuel cell production or film handleability if the film is used as a release film for producing a fuel cell. This document fails to disclose the reason why a copolymer of a cyclic olefin and a chain olefin is preferred among cyclic olefin polymers.

Japanese Patent Application Laid-Open Publication No. 2000-95957 (JP-2000-95957A, Patent Document 3) discloses a reversible thermotropic molding material having a first component and a second component; the first component consists of a transparent plastic material, and the second component consists of non-liquid crystal plastic material which is thermodynamically immiscible with the first component and is different in temperature dependency of refraction index from the first component. This document describes that an example of the first component includes a cycloolefin and that an example of a monomer constituting the second component includes vinylidene chloride. In working examples of this document, a molding material having a copolyamide in combination with a terpolymer containing a styrenic monomer or other monomers is prepared. The document also discloses that the applications of the molding material include reversible thermotropic plastic molding materials such as shielding systems for regulating the amount of light and temperature, for example, the glazing of buildings, greenhouses, cars, solar collecting systems and the like.

This document is also silent on a fuel cell. Further, this document fails to describe the meanings of combination of a cyclic olefin polymer and a chlorine-containing polymer.

CITATION LIST

Patent Literature

Patent Document 1: JP-2010-234570A (Claims and Example 2)
Patent Document 2: JP-2009-102558A (claim 1, and paragraphs [0052] and [0079])
Patent Document 3: JP-2000-95957A (Claims paragraph [0001], and Examples)

SUMMARY OF INVENTION

Technical Problem

It is therefore an object of the present invention to provide a polymer film (or a resin film) which has a moderate releasability from an electrolyte membrane and an electrode membrane of a polymer electrolyte fuel cell and a moderate adhesion to the electrolyte membrane and the electrode membrane and can adhere to a commonly-used substrate film without interposition of an adhesive layer such as an easily adhesive layer; and to provide a laminated film containing the polymer film, a process for producing the laminated film, and a process for producing the membrane electrode assembly using the polymer film.

Another object of the present invention is to provide a polymer film which has a high heat resistance or an excellent handleability and allows efficient production of a membrane electrode assembly (an electrolyte membrane and/or an electrode membrane) of a polymer electrolyte fuel cell; and to provide a laminated film containing the polymer film, a process for producing the laminated film, and a process for the membrane electrode assembly using the laminated film.

It is still another object of the present invention to provide a thin polymer film easily obtainable by coating, a laminated film containing the polymer film, a process for producing the laminated film, and a process for the membrane electrode assembly using the laminated film.

Solution to Problem

The inventors of the present invention made inventive studies to achieve the above objects and finally found that a polymer film containing a cyclic olefin polymer in combination with a chlorine-containing polymer has a moderate releasability from an electrolyte membrane and an electrode membrane of a polymer electrolyte fuel cell and a moderate adhesion to the electrolyte membrane and the electrode membrane and that the polymer film can adhere to a commonly-used substrate film without interposition of an adhesive layer such as an easily adhesive layer. The present invention was accomplished based on the above findings.

That is, an aspect of the present invention provides a polymer film comprising a polymer composition containing (A) a cyclic olefin polymer and (B) a chlorine-containing polymer. The chlorine-containing polymer (B) may comprise a vinylidene chloride-series polymer. The cyclic olefin polymer (A) may comprise a cyclic olefin copolymer (in particular, a copolymer of a norbornene compound and a chain $\alpha$-$C_{2-4}$olefin). The cyclic olefin polymer (A) may contain, as repeating units, (A1) a cyclic olefin unit and (A2) a chain olefin unit. The ratio (molar ratio) of the cyclic olefin unit (A1) relative to the chain olefin unit (A2) may be about 50/50 to 90/10 in the former/the latter. The cyclic olefin polymer (A) may comprise a cyclic olefin polymer free from an olefin unit having a $C_{3-10}$alkyl group as a side chain thereof. The ratio of the chlorine-containing polymer (B) relative to 100 parts by weight of the cyclic olefin polymer (A) may be about 0.5 to 60 parts by weight. The film of the present invention may be a release film for producing a membrane electrode assembly of a polymer electrolyte fuel cell.

Another aspect of the present invention provides a laminated film comprising a substrate layer and the film, as a release layer, on at least one side of the substrate layer. The substrate layer may comprise at least one member selected from the group consisting of a polyolefin, a poly(vinyl alcohol)-series polymer, a polyester, a polyamide, a polyimide, and a cellulose derivative. The substrate layer may comprise the polyester and may be free from an adhesive layer or an easily adhesive layer. The release layer may be formed by coating and may have an average thickness of about 0.01 to 20 μm. The laminated film of the present invention may further comprise an ion exchange layer, containing an ion exchange polymer, on the release layer. The ion exchange polymer may comprise a fluoropolymer comprising a side chain having a sulfonic acid group, and the ion exchange layer may be an electrolyte membrane and/or an electrode membrane.

A further aspect of the present invention provides a process for producing the laminated film, comprising a step of laminating a release layer on a substrate layer by coating a solution containing a polymer composition on the substrate layer.

A still further aspect of the present invention provides a process for producing a membrane electrode assembly of a polymer electrolyte fuel cell, comprising a step of separating the ion exchange layer containing the ion exchange polymer from the laminated film.

As used herein, the term "ion exchange layer" means a layer containing an ion exchange polymer. The ion exchange layer, which is not limited to an electrolyte membrane that is an ion exchange membrane, also includes an electrode membrane containing an ion exchange polymer and a catalyst.

Advantageous Effects of Invention

According to the present invention, the polymer film, which comprises a cyclic olefin polymer containing a cyclic olefin unit and a chain olefin unit in combination with a chlorine-containing polymer, has a moderate releasability (peelability) from an electrolyte membrane and an electrode membrane of a polymer electrolyte fuel cell and a moderate adhesion to the electrolyte membrane and the electrode membrane and can adhere to a commonly-used substrate film without interposition of an adhesive layer such as an easily adhesive layer. Further, the film, which contains a specific cyclic olefin polymer, has a high heat resistance and an excellent handleability and improves efficient production of a membrane electrode assembly (an electrolyte membrane and/or an electrode membrane) of a polymer electrolyte fuel cell. Furthermore, the film is easily obtainable as a thin film by coating. Such a film is windable up onto a roller and is continuously producible by a roll-to-roll processing. This allows improved production of the laminated film.

DESCRIPTION OF EMBODIMENTS

[Polymer Film]

The polymer film of the present invention comprises a polymer composition containing (A) a cyclic olefin polymer and (B) a chlorine-containing polymer.

(A) Cyclic Olefin Polymer

The cyclic olefin polymer (A) contains at least (A1) a cyclic olefin unit as a repeating unit. The cyclic olefin polymer (A) is an olefin polymer free from a long-chain alkyl group as a side chain thereof. Specifically, the olefin polymer (A) may be a cyclic olefin polymer free from an olefin unit having a $C_{3-10}$alkyl group (that is, a chain olefin unit having a $C_{3-10}$alkyl group and/or a cyclic olefin unit having a $C_{3-10}$alkyl group) as a side chain thereof.

A polymerizable component (a monomer) for forming the cyclic olefin unit (A1) is a polymerizable cyclic olefin having an ethylenic double bond in a ring thereof. The monomer is classifiable into a monocyclic olefin, a bicyclic olefin, a polycyclic (tri- or more-cyclic) olefin, or others.

The monocyclic olefin may include, for example, a $C_{4-12}$ cyclioolefin such as cyclobutene, cyclopentene, cycloheptene, or cyclooctene.

The bicyclic olefin may include, for example, 2-norbornene; a norbornene compound having a $C_{1-2}$alkyl group, such as 5-methyl-2-norbornene, 5,5-dimethyl-2-norbornene, or 5-ethyl-2-norbornene; a norbornene compound having an alkenyl group, such as 5-ethylidene-2-norbornene; a norbornene compound having an alkoxycarbonyl group, such as 5-methoxycarbonyl-2-norbornene or 5-methyl-5-methoxycarbonyl-2-norbornene; a norbornene compound having a cyano group, such as 5-cyano-2-norbornene; a norbornene compound having an aryl group, such as 5-phenyl-2-norbornene or 5-phenyl-5-methyl-2-norbornene; octalin; and an octalin having a $C_{1-2}$alkyl group, such as 6-ethyl-octahydronaphthalene.

The polycyclic olefin may include, for example, dicyclopentadiene; a derivative such as 2,3-dihydrodicyclopentadiene, methanooctahydrofluorene, dimethanooctahydronaphthalene, dimethanocyclopentadienonaphthalene, or methanooctahydrocyclopentadienonaphthalene; an adduct of cyclopentadiene and tetrahydroindene; and a trimer to tetramer of cyclopentadiene.

These cyclic olefins may be used alone or in combination. Among these cyclic olefins, in order to achieve well-balanced releasability and flexibility of the polymer film, the bicyclic olefin is preferred. The proportion of the bicyclic olefin (particularly, a norbornene compound) in the cyclic olefin (the cyclic olefin for forming the cyclic olefin unit (A1)) may be not less than 10% by mol, for example, not less than 30% by mol, preferably not less than 50% by mol, and more preferably not less than 80% by mol (particularly, not less than 90% by mol), or may be 100% by mol (the cyclic olefin may contain the bicyclic olefin alone). In particular, the cyclic olefin polymer containing the polycyclic (tri- or more-cyclic) olefin in a larger proportion is difficult to use in producing by a roll-to-roll processing.

Representative examples of the bicyclic olefin may include, for example, a norbornene (2-norbornene) which may have a substituent, and an octalin (octahydronaphthalene) which may have a substituent. As the substituent, there may be mentioned methyl group, ethyl group, an alkenyl group, an aryl group, a hydroxyl group, an alkoxy group, a carboxyl group, an alkoxycarbonyl group, an acyl group, a cyano group, an amide group, a halogen atom, or other groups. These substituents may be used alone or in combination. Among these substituents, a non-polar group, such as methyl group or ethyl group, is preferred from the perspective of prevention or elimination of loss in releasability of the polymer film. Among these bicyclic olefins, the norbornene compound, such as a norbornene or a norbornene having a $C_{1-2}$alkyl group (in particular, norbornene), is particularly preferred.

The cyclic olefin polymer (A) contains at least the cyclic olefin unit (A1) as a repeating unit. In the light of the adhesion of the polymer film to a substrate film or the mechanical characteristics of the polymer film, a preferred cyclic olefin polymer (A) includes a cyclic olefin copolymer (a cycloolefin copolymer). The cyclic olefin copolymer may be a copolymer of the cyclic olefin unit (A1) containing different kinds of cyclic olefin units or may be a copolymer of the cyclic olefin unit (A1) and another copolymerizable unit. Among these copolymers, the copolymer of the cyclic olefin unit (A1) and another copolymerizable unit is preferred in order to provide an excellent balance between the above-described adhesion and mechanical characteristics. In particular, a copolymer containing the cyclic olefin unit (A1) and a chain olefin unit (A2) as the repeating units is preferred. The copolymer may include a random copolymer, a block copolymer, or a graft copolymer.

The chain olefin unit (A2) may be a chain olefin unit produced by ring-opening of a cyclic olefin. In order to easily control the ratio of the cyclic olefin unit and the chain olefin unit, the chain olefin unit (A2) is preferably a unit obtainable from a chain olefin monomer.

Examples of the chain olefin may include a chain $C_{2-4}$ olefin such as ethylene, propylene, 1-butene, or isobutene. These chain olefins may be used alone or in combination. Among these chain olefins, a chain $\alpha$-$C_{2-3}$olefin is preferred, and ethylene is more preferred.

The ratio (molar ratio) of the cyclic olefin unit (A1) relative to the chain olefin unit (A2) [the former/the latter] can, for example, be selected from the range of about 1/99 to 99/1, and is, for example, about 30/70 to 95/5, preferably about 50/50 to 90/10 (e.g., about 55/45 to 80/20), and more preferably about 60/40 to 75/25 (particularly about 65/35 to 70/30). An excessively low ratio of the cyclic olefin unit (A1) tends to provide a polymer film having a low heat resistance, while an excessively high ratio of the cyclic olefin unit (A1) tends to provide a polymer film having low mechanical characteristics.

The cyclic olefin polymer (A) may further contain a copolymerizable unit other than the cyclic olefin unit (A1) and the chain olefin unit (A2). A polymerizable component (a copolymerizable monomer) for forming such a copolymerizable unit may include, for example, a vinyl ester monomer such as vinyl acetate or vinyl propionate; a diene monomer such as butadiene or isoprene; an ethylenic unsaturated carboxylic acid such as (meth)acrylic acid, maleic acid, fumaric acid, itaconic acid, citraconic acid, crotonic acid, isocrotonic acid, mesaconic acid, or angelic acid; an alkyl (meth)acrylate such as methyl (meth)acrylate, ethyl (meth)acrylate, or butyl (meth)acrylate; a (meth)acrylate such as a hydroxyalkyl (meth)acrylate or glycidyl (meth)acrylate; and a vinyl cyanide monomer such as (meth)acrylonitrile. These copolymerizable monomers may be used alone or in combination.

It is preferred that the ratio of the copolymerizable unit be within the range in which the releasability (peelability) of the polymer film from the ion exchange layer is not damaged. For example, the ratio of the copolymerizable unit relative to the total amount of an olefin unit (e.g., the total amount of the cyclic olefin unit (A1) and the chain olefin unit (A2)) is not more than 10% by mol, preferably not more than 5% by mol, and more preferably not more than 1% by mol.

The cyclic olefin polymer (A) has a number-average molecular weight of, for example, about 10,000 to 100,000 and preferably about 20,000 to 80,000 in terms of polystyrene in a gel permeation chromatography (GPC) (solvent:

toluene). A cyclic olefin polymer (A) having an excessively small molecular weight tends to have a reduced film-forming property. A cyclic olefin polymer (A) having an excessively large molecular weight has an increased viscosity and thus tends to be less easy to handle.

The cyclic olefin polymer (A) has a glass transition temperature (Tg) of, for example, about 50 to 350° C. (e.g., about 100 to 340° C.), preferably about 120 to 320° C. (e.g., about 160 to 300° C.), and more preferably about 160 to 250° C. (particularly about 170 to 200° C.) in a method in accordance with Japanese Industrial Standards (JIS) K7121-1087. A cyclic olefin polymer (A) having an excessively low glass transition temperature easily causes insufficient release (peeling) of the polymer film from the ion exchange layer due to a low heat resistance thereof. A cyclic olefin polymer (A) having an excessively high glass transition temperature makes the production of the polymer film difficult. As used herein, the glass transition temperature can be measured by a differential scanning calorimeter (DSC). For example, the glass transition temperature may be measured under a nitrogen flow at a heating rate of 10° C./minute by a differential scanning calorimeter ("DSC6200" manufactured by SII NanoTechnology Inc.) in accordance with JIS K7121

The cyclic olefin polymer (A) may be a polymer obtainable by addition polymerization or may be a polymer obtainable by ring-opening polymerization (e.g., ring-opening metathesis polymerization). The polymer obtainable by ring-opening metathesis polymerization may be a hydrogenated polymer. The cyclic olefin polymer may be obtained by a conventional polymerization method, for example, a ring-opening metathesis polymerization using a metathesis polymerization catalyst, an addition polymerization using a Ziegler catalyst, and an addition polymerization using a metallocene catalyst (usually, a ring-opening metathesis polymerization using a metathesis polymerization catalyst). For example, concrete polymerization methods include those described in Japanese Patent Application Laid-Open Publication Nos. 2004-197442, 2007-119660, and 2008-255341, Macromolecules, 43, 4527 (2010), Polyhedron, 24, 1269 (2005), J. Appl. Polym. Sci, 128 (1), 216 (2013), or Polymer Journal, 43, 331 (2011). The polymerization catalyst to be used may include a conventional catalyst, for example, a catalyst synthesized by the method as described in these documents, Macromolecules, 31, 3184 (1988), or Journal of Organometallic Chemistry, 2006, vol. 691, page 193.

(B) Chlorine-Containing Polymer

The chlorine-containing polymer (B) may be a chlorinated polymer such as a chlorinated polyethylene or a chlorinated polypropylene. The chlorine-containing polymer (B) is usually a polymer containing a chlorine-containing monomer as a polymerizable component. According to the present invention, mixing the cyclic olefin polymer (A) with the chlorine-containing polymer (B) allows the polymer film to adhere to a commonly-used substrate film such as a poly(ethylene terephthalate) (PET) film without interposition of an adhesive layer such as an easily adhesive layer, while the polymer film maintains a moderate adhesion (releasability) to an ion exchange layer.

The chlorine-containing monomer may include, for example, a vinyl chloride monomer and a vinylidene chloride monomer. These chlorine-containing monomers may be used alone or in combination. Among them, the vinylidene chloride monomer is preferred in terms of adhesion of the polymer film to a substrate film.

The chlorine-containing polymer may contain a copolymerizable unit other than the chlorine-containing monomer unit. A polymerizable component for forming such a copolymerizable unit may include, for example, the copolymerizable monomer as described in the paragraph of the cyclic olefin polymer (A). The copolymerizable monomers may be used alone or in combination. Among the copolymerizable monomers, a widely used one includes vinyl acetate, (meth)acrylic acid, an alkyl (meth)acrylate, a hydroxyalkyl (meth)acrylate, glycidyl (meth)acrylate, (meth)acrylonitrile, or other monomers.

The copolymerizable unit (copolymerizable monomer) is contained at any proportion that does not damage the characteristics of the chlorine-containing polymer. The proportion of the copolymerizable unit in the whole chlorine-containing polymer may be usually about 0.1 to 50% by weight (e.g., about 0.3 to 25% by weight), preferably about 0.5 to 20% by weight, and more preferably about 1 to 15% by weight (e.g., about 3 to 10% by weight).

The chlorine-containing polymer (B) may include, for example, a vinyl chloride-series polymer [e.g., a homopolymer of vinyl chloride monomer (a poly(vinyl chloride)) and a vinyl chloride-series copolymer (such as a vinyl chloride-vinyl acetate copolymer or a vinyl chloride-(meth)acrylate copolymer)] and a vinylidene chloride-series polymer [e.g., a homopolymer of vinylidene chloride (a poly (vinylidene chloride)) and a vinylidene chloride-series copolymer (such as a vinylidene chloride-vinyl chloride copolymer, a vinylidene chloride-vinyl acetate copolymer, a vinylidene chloride-(meth)acrylic acid copolymer, a vinylidene chloride-(meth)acrylate copolymer, or a vinylidene chloride-(meth)acrylonitrile copolymer)]. These chlorine-containing polymers may be used alone or in combination.

Among these chlorine-containing polymers, the vinylidene chloride-series polymer (in particular, a vinylidene chloride-series copolymer such as a vinylidene chloride-vinyl chloride copolymer) is preferred in order to improve the adhesion to a substrate film. In the vinylidene chloride-vinyl chloride copolymer, the ratio (molar ratio) of the vinylidene chloride unit relative to the vinyl chloride unit is, for example, about 99/1 to 5/95, preferably about 97/3 to 10/90, and more preferably about 95/5 to 50/50 in the former/the latter. The vinylidene chloride-series polymer may be free from an emulsifier to be contained in an aqueous emulsion, a surfactant, or other agents.

The chlorine-containing polymer (B) may have a number-average molecular weight of, for example, about 10,000 to 500,000, preferably about 20,000 to 250,000, and more preferably about 25,000 to 100,000 in terms of polystyrene in a gel permeation chromatography (GPC).

The ratio of the chlorine-containing polymer (B) relative to 100 parts by weight of the cyclic olefin polymer (A) may be more than 0.2 parts by weight and less than 100 parts by weight. The ratio is, for example, about 0.5 to 90 parts by weight (e.g., about 0.5 to 60 parts by weight), preferably about 0.8 to 70 parts by weight (e.g., about 1 to 60 parts by weight), and more preferably about 1.2 to 50 parts by weight (particularly about 1.5 to 30 parts by weight). A polymer film containing the chlorine-containing polymer (B) in a low ratio can also have an improved adhesion to a substrate film. Thus the ratio of the chlorine-containing polymer (B) relative to 100 parts by weight of the cyclic olefin polymer (A) may be, for example, about 0.5 to 30 parts by weight, preferably about 0.8 to 10 parts by weight (e.g., about 1 to 5 parts by weight), and more preferably about 1.2 to 3 parts by weight (particularly about 1.5 to 2.5 parts by weight). Too low a ratio of the chlorine-containing polymer can make it difficult to provide a polymer film having an improved adhesion to a substrate film. Too high a ratio the chlorine-containing polymer can provide a polymer film having a reduced releasability from an ion exchange layer.

The polymer layer may further contain another polymer or a commonly used additive. Examples of another polymer may include a chain olefin polymer (such as a polyethylene or a polypropylene). The commonly used additive may include, for example, a filler, a lubricant (such as a wax, a fatty acid ester, or a fatty acid amide), an antistatic agent, a stabilizer (such as an antioxidant, a heat stabilizer, or a light stabilizer), a flame retardant, a viscosity modifier, a thickener, and a defoaming agent. The polymer layer may contain any organic or inorganic particle (in particular, an antiblocking agent such as zeolite) that has no adverse effect on the surface smoothness of the polymer layer.

In particular, the present invention allows the polymer layer to have an improved releasability (peelability) even if the release layer is free from a low molecular weight releasing agent (such as a silicone compound) with which the electrolyte membrane or the electrode membrane is easily contaminated. The polymer layer preferably contains substantially no silicone compound.

The polymer film (release layer) can, for example, have an average thickness selected from the range of about 0.01 to 100 μm. The polymer film can be formed as a surface-smooth thin film by coating. Such a film has an average thickness of, for example, about 0.01 to 20 μm, preferably about 0.03 to 15 μm, and more preferably about 0.05 to 10 μm (particularly about 0.1 to 5 μm). The thin polymer film, which is easy to handle, is suitable for a roll-to-roll processing or others and is economically efficient. For the polymer film, the average thickness can be calculated on the basis of the amount of a coating composition for the polymer film (the weight of the solid contents (active ingredients) per unit area) and the density.

The polymer film of the present invention has excellent releasability and heat resistance and is thus utilizable as an industrial release film. The polymer film has a moderate adhesion to an ion exchange layer and a moderate releasability (peelability) from an ion exchange layer and is thus preferably utilizable as a release film for producing a membrane electrode assembly (MEA) of a polymer electrolyte fuel cell. In particular, the film may preferably be used as follows: an electrolyte membrane and/or an electrode membrane, each containing an ion exchange polymer, is laminated on the film(s) to produce an MEA from which the film(s) is then separated.

[Laminated Film]

The polymer film of the present invention, which has excellent releasability and heat resistance, may be used alone as a (single-layer) release film. In the light of improved production of a fuel cell and easy formation of a thin film having a uniform thickness, it is preferred that the polymer film be laminated as a release layer on at least one side of a substrate layer (a substrate film).

(Substrate Layer)

The substrate layer improves the dimensional stability of the release film in a production process of a fuel cell. In particular, the substrate layer prevents the release film from elongating if a tensile force is given to the release film by a roll-to-roll processing. Further, the substrate layer maintains a high dimensional stability and prevents the release film from separating from the electrolyte membrane or the electrode membrane, even if the release film is exposed to a high temperature by a drying step, a thermocompression treatment, or others. From such respects, the substrate layer is preferably composed of a material having a high heat resistance and a high dimensional stability. Specifically, the substrate layer may be composed of a synthetic polymer having an elastic modulus of 100 to 1000 MPa at 150° C. The elastic modulus may be, for example, about 120 to 1000 MPa, preferably about 150 to 1000 MPa, and more preferably about 200 to 1000 MPa. A substrate layer having an excessively low elastic modulus may reduce the dimensional stability of the laminated film and give rise to separation of the release layer from the electrolyte membrane or the electrode membrane in production by a roll-to-roll processing. This may cause inefficient production of a fuel cell.

As the synthetic polymer, for example, there may be used various thermoplastic polymers or thermosetting polymers. The thermoplastic polymer, which has a suitable flexibility for production by a roll-to-roll processing, is preferred. The thermoplastic polymer may include, for example, a polyolefin (such as a polypropylene-series polymer or a cyclic polyolefin), a poly(vinyl alcohol)-series polymer, a polyester, a polyamide, a polyimide, a polycarbonate, a poly(phenylene ether), a poly(phenylene sulfide), and a cellulose derivative (e.g., a cellulose ester such as a cellulose acetate). These thermoplastic polymers may be used alone or in combination. According to the present invention, the release layer (polymer film) has an excellent adhesion to the substrate layer, and it is thus preferred that these thermoplastic polymers substantially have no reactive group or polar group (such as a side chain having a reactive group) for improving the adhesion. Among these thermoplastic polymers, a preferred one may include at least one member selected from the group consisting of the polyolefin, the poly(vinyl alcohol)-series polymer, the polyester, the polyamide, the polyimide, and the cellulose derivative (in particular, at least one member selected from the group consisting of the polyolefin, the polyester, the polyimide, and the cellulose ester). In terms of well-balanced heat resistance and flexibility, the polyester and the polyimide are particularly preferred. As the polyester, a poly($C_{2-4}$alkylene arylate)-series polymer such as a poly(ethylene terephthalate) (PET) or a poly(ethylene naphthalate) (PEN) may preferably be used. The polyimide may include a thermoplastic polyimide, a polyetherimide, a polyamideimide, or other polyimides.

The substrate layer may be composed of a stretched film in order to improve the strength of the laminated film. The stretching may be monoaxially stretching. In order to improve the strength of the film, biaxially stretching is preferred. The stretching ratio in each of machine and crosswise directions may for example be not less than 1.5 (e.g., about 1.5 to 6), or is preferably about 2 to 5 and more preferably about 3 to 4. In a case where the stretching ratio is too low, the strength of the film tends to be insufficient.

The substrate layer may contain a commonly used additive as exemplified in the paragraph of the polymer film. The proportion of the synthetic polymer in the substrate layer may, for example, be not less than 80% by weight, preferably not less than 90% by weight, and more preferably not less than 95% by weight (e.g., 95 to 100% by weight).

The substrate layer has a surface smoothness that allows the formation of the release layer thereon by coating. The surface smoothness of the substrate layer is not limited. The substrate layer may have an arithmetic average roughness Ra of not more than 1 μm and preferably not more than 100 nm (e.g., about 10 to 100 nm) in accordance with JIS B0601.

The substrate layer may be surface-treated in order to improve the adhesion to the release layer. The surface treatment may include a conventional surface treatment, for example, a corona discharge treatment, a flame treatment, a plasma treatment, and an ozone or ultraviolet ray irradiation treatment. Among them, the corona discharge treatment is preferred.

The substrate layer may have an easily adhesive layer formed of a commonly used adhesive polymer (for example, an easily adhesive layer formed of an adhesive polymer such as a low molecular weight polyester, an aliphatic polyester, or an amorphous polyester in a case where the substrate layer is a polyester substrate layer) or may substantially have no easily adhesive layer. Among them, the substrate layer having no easily adhesive layer is particularly preferred from the viewpoint in that the release layer (the polymer film) has an excellent adhesion to the substrate layer and an adhesion necessary for producing a fuel cell. Thus, according to the present invention, the substrate layer having no easily adhesive layer can be used to simplify the layer structure of the laminate and to reduce the thickness of the laminate.

The substrate layer has an average thickness of, for example, about 1 to 300 µm, preferably about 5 to 200 µm, and more preferably about 10 to 100 µm (particularly about 20 to 80 µm). A substrate layer having an excessively large thickness makes it difficult to produce the release film by a roll-to-roll processing. A substrate layer having an excessively small thickness has a low dimensional stability and is hard to convey (or transport) in a roll-to-roll processing. This may cause wrinkles in the layer.

(Ion Exchange Layer)

The laminated film (laminate) of the present invention may be a release film for producing a polymer electrolyte fuel cell. In a case where the laminated film is used as the release film, an ion exchange layer containing an ion exchange polymer (electrolyte membrane, electrode membrane, membrane electrode assembly) is allowed to adhere (or closely contact) on the release layer of the laminated film (the release film). The laminated film of the present invention may thus be a laminate in which an ion exchange layer containing an ion exchange polymer is laminated on the release layer of the release film (the release layer composed of the polymer film alone, or the release layer of the laminated film). That is, the laminate may be a laminate having the release film and the ion exchange layer.

As the ion exchange polymer, a conventional ion exchange polymer utilized for a fuel cell can be used. In particular, a cation exchange polymer such as a strongly acidic cation exchange polymer or a slightly acidic cation exchange polymer is preferred. The cation exchange polymer may include, for example, an ion exchange polymer having a sulfonic acid group, a carboxyl group, a phosphoric acid group, a phosphonic acid group, or other groups (specifically, an ion exchange polymer having, as an electrolytic group having an electrolytic function, a sulfonic acid group, a carboxyl group, a phosphoric acid group, a phosphonic acid group, or other groups). A particularly preferred one includes an ion exchange polymer having a sulfonic acid group (an ion exchange polymer having a sulfonic acid group as an electrolytic group).

As the ion exchange polymer having the sulfonic acid group, there may be used various polymers, each having a sulfonic acid group. Such a polymer may include, for example, a polyolefin (such as a polyethylene or a polypropylene), a (meth)acrylic polymer, a styrenic polymer, a polyacetal, a polyester, a polycarbonate, a polyamide, a polyamideimide, a polyimide, a polyether, a polyetherimide, a polyetherketone, a polyetheretherketone, a polysulfone, a polyethersulfone, a poly(phenylene sulfide), and a fluoropolymer.

Among the ion exchange polymers having the sulfonic acid group, a preferred one may include a fluoropolymer having a sulfonic acid group, a sulfonated product of a crosslinked polystyrene, or other polymers. The polymer may be a polystyrene-graft-polyethylenetetrafluoroethylene copolymer having a sulfonic acid group, a polystyrene-graft-polytetrafluoroethylene copolymer having a sulfonic acid group, or other polymers. Among them, in terms of releasability or others, a fluoropolymer (e.g., a fluorohydrocarbon polymer in which at least some hydrogen atoms are replaced with fluorine atoms) having a sulfonic acid group is particularly preferred. In particular, for the polymer electrolyte fuel cell, a preferred one may include a fluoropolymer containing a side chain having a sulfonic acid group (or —$CF_2CF_2SO_3H$ group), for example, a copolymer (e.g., a block copolymer) of [2-(2-sulfotetrafluoroethoxy)hexafluoropropoxy] trifluoroethylene and tetrafluoroethylene, or other polymers.

The ion exchange polymer may have an ion exchange capacity of not less than 0.1 meq/g, for example, about 0.1 to 2.0 meq/g, preferably about 0.2 to 1.8 meq/g, and more preferably about 0.3 to 1.5 meq/g (particularly about 0.5 to 1.5 meq/g).

As such an ion exchange polymer, "registered trademark: Nafion" manufactured by DuPont, or other commercially available products may be used. As the ion exchange polymer, there may be used an ion exchange polymer described in Japanese Patent Application Laid-Open Publication No. 2010-234570, or other polymers.

The ion exchange layer may be an electrolyte membrane composed of the ion exchange polymer, or an electrode membrane containing the ion exchange polymer and a catalyst particle.

In the electrode membrane (catalyst layer or electrode catalyst membrane), the catalyst particle contains a metallic component having a catalytic action (in particular, a noble metal simple substance such as platinum (Pt), or an alloy containing a noble metal such as platinum (Pt)). Typically, in an electrode membrane for a cathode, the catalyst particle contains platinum, and in an electrode membrane for an anode, the catalyst particle contains a platinum-ruthenium alloy. The catalyst particle is typically used as a composite particle having the metallic component supported on a conductive material (e.g., a carbon material such as carbon black). For the electrode membrane, the ratio of the ion exchange polymer relative to 100 parts by weight of the catalyst particle is, for example, about 5 to 300 parts by weight, preferably about 10 to 250 parts by weight, and more preferably about 20 to 200 parts by weight.

The ion exchange layer may also contain a commonly used additive as exemplified in the paragraph of the polymer film. For example, the ion exchange layer may contain an inorganic material such as an inorganic particle or an inorganic fiber (e.g., a carbonaceous material, a glass, and a ceramics).

The ion exchange layer is disposed (or formed) on at least one side of the release layer. The ion exchange layer may be disposed (or formed) on both sides of the release layer or may be formed on one side of the release layer.

The ion exchange layer has an average thickness of, for example, about 1 to 500 µm, preferably about 1.5 to 300 µm, and more preferably about 2 to 200 µm.

The electrolyte membrane has an average thickness of, for example, about 1 to 500 µm, preferably about 5 to 300 µm, and more preferably about 10 to 200 µm.

The electrode membrane has an average thickness of, for example, about 1 to 100 μm, preferably about 2 to 80 μm, and more preferably about 2 to 50 μm.

[Process for Producing Polymer Film, Laminated Film, and Membrane Electrode Assembly]

In the light of easy formation of a thin surface-smooth film, the polymer film of the present invention can be produced by coating (or applying) a coating agent containing a polymer composition and a solvent (for example, a coating agent solution) on a substrate. Specifically, the laminated film can be produced by coating (or casting) a coating agent containing a cyclic olefin polymer, a chlorine-containing polymer, and a solvent on a substrate layer and then drying the resulting product. For the production of the polymer film as a single-layer film, the coating agent may be coated (or applied) on a releasable (or detachable) substrate.

The coating method may include a conventional manner, for example, a roll coater, an air knife coater, a blade coater, a rod coater, a reverse coater, a bar coater, a comma coater, a die coater, a gravure coater, a screen coater, a spraying method, and a spinner method. Among these methods, the blade coater, the bar coater, or the gravure coater is widely used.

As the solvent, a nonpolar solvent may be used. For example, the solvent may include an aliphatic hydrocarbon (such as hexane), an alicyclic hydrocarbon (such as cyclohexane), an aromatic hydrocarbon (such as toluene or xylene), an aromatic oil (such as solvent naphtha), and an ether (such as tetrahydrofuran or dioxane). These solvents may be used alone or in combination. Among them, a preferred one may include the aromatic hydrocarbon such as toluene, the aromatic oil such as solvent naphtha, a cyclic ether such as tetrahydrofuran, or other solvents. A particularly preferred one may include a mixed solvent of the aromatic hydrocarbon and the cyclic ether.

The solid content of the coating agent (the concentration of the polymer composition or the concentration of the active ingredients) may for example be about 0.1 to 50% by weight, preferably about 0.3 to 30% by weight, and more preferably about 0.5 to 20% by weight (particularly about 0.8 to 15% by weight).

The drying may be natural drying (or air drying). The solvent may be evaporated by heat drying. The drying temperature may be not lower than 50° C., and is, for example, about 50 to 200° C., preferably about 60 to 150° C., and more preferably about 80 to 120° C.

For the laminated film having the ion exchange layer (the laminate of the release film and the ion exchange layer), the ion exchange layer may be laminated on the release layer (the release layer composed of the polymer film alone, or the release layer of laminated film).

For this laminated film, the ion exchange layer (an electrolyte membrane containing an ion exchange polymer and/or an electrode membrane containing an ion exchange polymer) is formed on the release layer by coating. For example, an electrolyte membrane may be laminated on a release layer of a first film (a release film) by coating to give a laminate having the electrolyte membrane laminated on the first release film, and an electrode membrane may be laminated on a release layer of a second film by coating to give a laminate having the electrode membrane laminated on the second release film.

In order to form the electrolyte membrane and the electrode membrane by coating (or casting), the electrolyte membrane and the electrode membrane are coated in the state of a solution or dispersion containing an ion exchange polymer (and a catalyst particle) dissolved or dispersed in a solvent.

The solvent may include, for example, water, an alcohol (e.g., a $C_{1-4}$alkanol such as methanol, ethanol, isopropanol, or 1-butanol), a ketone (such as acetone or methyl ethyl ketone), an ether (such as dioxane or tetrahydrofuran), and a sulfoxide (such as dimethylsulfoxide). These solvents may be used alone or in combination. Among these solvents, in terms of easy handling or other characteristics, water or a mixed solvent containing water and a $C_{1-4}$alkanol is widely used. The solution or dispersion has a concentration of a solute or solid (an ion exchange polymer, a catalyst particle) of, for example, about 1 to 80% by weight, preferably about 2 to 60% by weight, and more preferably about 3 to 50% by weight.

The coating method may include a conventional manner as exemplified in the paragraph of the process for producing the release film. Among these methods, the blade coater, the bar coater, or other methods are widely used.

After the solution containing the ion exchange polymer (and the catalyst particle) is coated, the solvent may be evaporated by heat drying. The drying temperature may be not lower than 50° C. For the electrolyte membrane, for example, the drying temperature is about 80 to 200° C. (particularly about 100 to 150° C.). For the electrode membrane, for example, the drying temperature is about 50 to 150° C. (particularly about 60 to 120° C.).

The laminate obtained in the laminating step is usually subjected to a bonding (or closely contacting) step. For a continuous production, before the bonding step, the laminate is transported to a place where the bonding step is carried out.

According to the present invention, the polymer film or the laminated film has an excellent flexibility, and thus the laminating step with such a transport can be carried out by a roll-to-roll processing, achieving improved production of the release film. Further, combination of the release layer and the substrate layer gives an excellent dimensional stability to the laminated film and thus prevents the laminated film from elongating if a tensile force is applied by a roll-to-roll processing. This allows the release film to be rolled up without separation of the ion exchange layer, achieving improved production.

The laminate obtained may be subjected to the bonding step. In the bonding step, an electrolyte membrane laminated on a release layer of a first release film is bonded to an electrode membrane laminated on a release layer of a second release film to prepare a membrane electrode assembly.

The electrolyte membrane and the electrode membrane are usually bonded by thermocompression. The heating temperature is, for example, about 80 to 250° C., preferably about 90 to 230° C., and more preferably about 100 to 200° C. The pressure is, for example, about 0.1 to 20 MPa, preferably about 0.2 to 15 MPa, and more preferably about 0.3 to 10 MPa.

The composite obtained in the bonding step (a laminate of the electrolyte membrane and the electrode membrane bonded to each other) is subjected to a step for separating the release films from the ion exchange layers (the electrolyte membrane and/or the electrode membrane) to give a membrane electrode assembly for a polymer electrolyte fuel cell. According to the present invention, the laminate passed through the above-mentioned drying step or thermocompression step has a moderate peel strength. Thus the release film is not separated from the ion exchange layer in the laminating step or the bonding step, while the release film is easily separable in the separating step. This improves handleability in obtaining the laminate.

The release layer of the release film (the polymer film or the laminated film) has a given releasability to the ion exchange layer. The peel strength between the release layer of the release film and the ion exchange layer (in particular, the peel strength of the laminate in the separating step) is, for example, about 0.1 to 100 mN/mm and preferably about 0.5 to 80 mN/mm. In a case where the peel strength is too large, it is difficult to separate the release layer from the ion exchange layer. In a case where the peel strength is too small, the handleability in the laminating step and bonding step is low.

As used herein, the peel strength can be measured by allowing the release film bonded to the ion exchange layer to stand at 20° C. and 50% RH for one hour or more and then subjecting the release film to 180° separation (or peeling) under a condition of 300 mm/minute.

Further, in the same manner as the bonding step and the separating step, an electrode membrane of a laminate having the electrode membrane laminated on a release layer of a third release film (wherein the electrode membrane is an electrode membrane for a cathode in a case where the second release film is used for an electrode membrane for an anode) is bonded to the electrolyte membrane separated from the first release film, and the release film is separated. A fuel gas supply layer and an air supply layer are laminated on the corresponding electrode membranes by a conventional method to give a membrane electrode assembly (MEA).

EXAMPLES

The following examples are intended to describe this invention in further detail and should by no means be interpreted as defining the scope of the invention. The release films obtained in Examples and Comparative Examples were evaluated for the characteristics according to the following methods.

[Raw Materials]

Ion exchange polymer solution: a solution of a perfluoropolymer containing a side chain having a sulfonic acid group, "Nafion (registered trademark) DE2021CS" manufactured by DuPont, solid content of 20% by weight PET film: "polyester film EMBLET (registered trademark) S50" manufactured by UNITIKA LTD., thickness of 50 μm, no easily adhesive layer OPP film: "P3018" manufactured by TOYOSHINA FILM CO., LTD., thickness of 30 μm, no easily adhesive layer TAC film: "Z-TAC" manufactured by FUJIFILM Corporation, thickness of 60 μm, no easily adhesive layer Nb/Et: a 2-norbornene.ethylene copolymer, "TOPAS (registered trademark) 6017S-04" manufactured by TOPAS Advanced Polymers GmbH, glass transition temperature of 178° C.

PVDC: a vinylidene chloride-series copolymer, "PVDC Resin R204" manufactured by ASAHI KASEI CHEMICALS CORPORATION

[Adhesion (Adhesion of Release Layer to Substrate Layer)]

For each release film obtained in Examples and Comparative Examples, the release film was allowed to stand at 20° C. and 50 RH % for one hour or over. Thereafter, a cellulose adhesive tape ("CT405AP-15" manufactured by NICHIBAN CO., LTD.) was strongly attached to the release layer by pressure, and the tape was removed by pulling the tape off rapidly as close to an angle of 45°. The adhesion was evaluated by determining the area ratio of the remaining coat (release layer) area relative to the area in which the tape was removed.

[Releasability (Releasability of Release Layer and Ion Exchange Polymer Layer)]

Each release film obtained in Examples and Comparative Examples and an ion exchange polymer dispersion ("Nafion (registered trademark) DE2020CS" manufactured by DuPont, a water-alcohol dispersion of an ion exchange polymer, solid content: 20% by weight) were provided. The ion exchange polymer dispersion was cast on the release layer of the release film using a doctor blade to give a coat, and the coated film were dried in an oven at 100° C. to form a laminate containing an ion exchange layer (20 μm thick) as an electrolyte membrane.

A cellulose adhesive tape ("CT405AP-15" manufactured by NICHIBAN CO., LTD.) was strongly attached to the ion exchange layer of the resulting laminate by pressure, and the tape was peeled off. The releasability was evaluated on the basis of the following criteria.

A: The ion exchange layer is wholly peeled off.

B: The ion exchange layer is not peeled off.

Comparative Example 1

Nb/Et was added to toluene so that the solid content (the concentration of the polymer component) was 5% by weight. The mixture was heated for dissolution to prepare a liquid coating composition. The resulting liquid coating composition was applied on one side of PET film by Meyer bar coating and dried at a temperature of 100° C. for one minute to form a release layer (dry thickness: 0.3 μm), and thus a release film was obtained.

Comparative Example 2

A release film was obtained in the same manner as Comparative Example 1 except that OPP film was used instead of PET film.

Comparative Example 3

A release film was obtained in the same manner as Comparative Example 1 except that TAC film was used instead of PET film.

Example 1

To a mixed solvent of toluene and tetrahydrofuran (toluene/tetrahydrofuran=70/30 (weight ratio)) was added 100 parts by weight of Nb/Et and 1 part by weight of PVDC so that the solid content (the concentration of the polymer components) was 5% by weight. The mixture was heated for dissolution to prepare a liquid coating composition. In the same manner as Comparative Example 1, the resulting liquid coating composition was used to give a release film.

Example 2

A release film was obtained in the same manner as Example 1 except that the ratio of PVDC was 1.2 parts by weight.

Example 3

A release film was obtained in the same manner as Example 1 except that the ratio of PVDC was 2 parts by weight.

Example 4

A release film was obtained in the same manner as Example 3 except that the solid content (the concentration of the polymer components) was 0.5% by weight and that the dry thickness of the release layer was 0.01 μm.

Example 5

A release film was obtained in the same manner as Example 1 except that the ratio of PVDC was 60 parts by weight.

Table 1 shows the evaluation results of the release films obtained in Examples and Comparative Examples.

TABLE 1

|  | Substrate film | Cyclic olefin polymer | Ratio of P-VDC (parts by weight) | Thickness (μm) | Adhesion | Releasability |
|---|---|---|---|---|---|---|
| Comparative Example 1 | PET | Nb/Et | 0 | 0.3 | 0/100 | — |
| Comparative Example 2 | OPP | Nb/Et | 0 | 0.3 | 0/100 | — |
| Comparative Example 3 | TAC | Nb/Et | 0 | 0.3 | 0/100 | — |
| Example 1 | PET | Nb/Et | 1 | 0.3 | 90/100 | A |
| Example 2 | PET | Nb/Et | 1.2 | 0.3 | 100/100 | A |
| Example 3 | PET | Nb/Et | 2 | 0.3 | 100/100 | A |
| Example 4 | PET | Nb/Et | 2 | 0.01 | 100/100 | A |
| Example 5 | PET | Nb/Et | 60 | 0.3 | 100/100 | A |

As apparent from the results described in Table 1, the release films of Comparative Examples 1 to 3 had a low adhesion of the release layer to the substrate layer. In contrast, the release films of Examples had an excellent balance of adhesion and releasability.

INDUSTRIAL APPLICABILITY

The polymer film of the present invention, which has an excellent releasability and an excellent heat resistance, is utilizable as various industrial release films or other films. In particular, the polymer film, which has a moderate releasability (peelability) from an ion exchange layer and a moderate adhesion to the ion exchange layer, is suitable as a release film for producing a membrane electrode assembly of a polymer electrolyte fuel cell.

The invention claimed is:

1. A membrane electrode assembly of a polymer electrolyte fuel cell, which comprises a laminated film and an ion exchange layer,
    wherein the laminated film comprises a substrate layer and a release layer on at least one side of the substrate,
    wherein the release layer has an average thickness of 0.01 to 20 μm, and
    the release layer comprises a polymer composition containing:
    (A) a cyclic olefin polymer; and
    (B) a vinylidene chloride-series polymer,
    wherein the ion exchange layer is formed on the release layer and comprises an ion exchange polymer.

2. The membrane electrode assembly according to claim 1, wherein the cyclic olefin polymer (A) comprises a cyclic olefin copolymer.

3. The membrane electrode assembly according to claim 1, wherein the cyclic olefin polymer (A) contains (A1) a cyclic olefin unit and (A2) a chain olefin unit as repeating units.

4. The membrane electrode assembly according to claim 3, wherein a ratio (molar ratio) of the cyclic olefin unit (A1) relative to the chain olefin unit (A2) is 50/50 to 90/10 in the former/the latter.

5. The membrane electrode assembly according to claim 1, wherein the cyclic olefin polymer (A) comprises a copolymer of a norbornene compound and a chain $\alpha$-$C_{2-4}$olefin.

6. The membrane electrode assembly according to claim 1, wherein the cyclic olefin polymer (A) comprises a cyclic olefin polymer free from an olefin unit having a $C_{3-10}$alkyl group as a side chain thereof.

7. The membrane electrode assembly according to claim 1, wherein a ratio of the vinylidene chloride-series polymer (B) relative to 100 parts by weight of the cyclic olefin polymer (A) is 0.5 to 60 parts by weight.

8. The membrane electrode assembly according to claim 1, wherein the substrate layer comprises at least one member selected from the group consisting of a polyolefin, a poly(vinyl alcohol)-series polymer, a polyester, a polyamide, a polyimide, and a cellulose derivative.

9. The membrane electrode assembly according to claim 8, wherein the substrate layer comprises the polyester and is free from an adhesive layer or an easily adhesive layer.

10. The membrane electrode assembly according to claim 1, wherein the release layer is formed by coating.

11. The membrane electrode assembly according to claim 1, wherein the ion exchange polymer comprises a fluoropolymer comprising a side chain having a sulfonic acid group, and the ion exchange layer comprising the ion exchange polymer is an electrolyte membrane, an electrode membrane, or both.

12. A process for producing a membrane electrode assembly recited in claim 1, comprising: a step of laminating the release layer on the substrate layer by coating a solution containing the release layer composition on the substrate layer.

13. A process for producing a membrane electrode assembly according to claim 12, further comprising: a step of separating the ion exchange layer containing the ion exchange polymer from the laminated film.

* * * * *